United States Patent Office 3,360,529
Patented Dec. 26, 1967

3,360,529
GUANIDINOALKYLBENZODIOXAN DERIVATIVES
John Nicholson Gardner, Bloomfield, N.J., assignor to Smith Kline & French Laboratories, Philadelphia, Pa., a corporation of Pennsylvania
No Drawing. Filed Jan. 15, 1963, Ser. No. 251,471
Claims priority, application Great Britain, Jan. 29, 1962, 3,340/62
6 Claims. (Cl. 260—340.3)

This invention relates to new 1:4-benzodioxan derivatives having pharmacodynamic activity.

More specifically, the compounds of this invention are guanidinoalkyl-1:4-benzodioxans illustrated by the following structural formula:

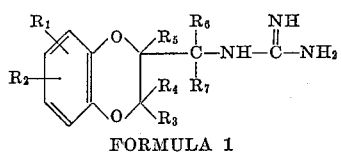

FORMULA 1 in which $R_1$ and $R_2$ are hydrogen, halogen such as fluoro, bromo or chloro; lower alkyl such as methyl or ethyl; lower alkoxy such as methoxy or ethoxy; carbalkoxy such as carbomethoxy or carbethoxy; or nitro; $R_3$–$R_7$ are hydrogen or lower alkyl.

The pharmaceutically acceptable acid addition salts of the bases of Formula 1 are also including in the scope of this invention and are usually preferred. Such salts are, for example, nontoxic salts such as the hydrochloride, sulfate, phosphate, ethanedisulfonate, maleate, nitrate, etc. The salts are prepared by conventional methods well-known to the art. The salts are preferably used because of a degree of instability of some of the bases.

Advantageous compounds of this invention are represented by the following structural formula:

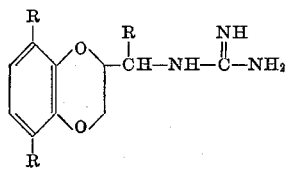

FORMULA 2 in which R is respectively hydrogen or methyl.

Preferred individual compounds are the bases, 2-guanidinomethyl - 1:4 - benzodioxan, 2 - 1' - guanidinoethyl-1:4 - benzodioxan, 5:8 - dimethyl - 2 - guanidinomethyl-1:4-benzodioxan and 5:8-dimethyl-2-1'-guanidinoethyl-1:4-benzodioxan and their pharmaceutically acceptable salts.

Certain of the compounds of this invention contain one or more asymmetric carbon atoms and, therefore, can exist in the form of optical isomers. Such isomers and their salts are included in this invention as are other position isomers, together with other structural variations obvious to one skilled in the art. The terms lower alkyl, lower alkoxy or carbalkoxy are used to define moieties having a maximum of 3 carbon atoms.

The compounds of this invention are most easily prepared by reacting an amine or its salt having the basic general formula:

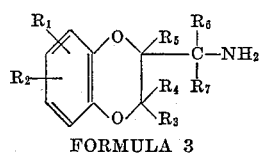

FORMULA 3 in which $R_1$–$R_7$ are as defined, with cyanamide or with a compound

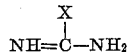

in which X represents a replaceable group which will react with the amino group of Formula 3. Examples of the second reactant are S-methylisothiouronium salts, O-methylisouronium salts and 1-amidino-3:5-dimethylpyrazole. The end products are most conveniently isolated as their acid salts. Other pharmaceutically unacceptable salts are useful in such isolation procedures and can be thereafter converted to nontoxic salts for use.

The amine intermediates of Formula 3 are prepared by methods well-known to the art as illustrated by the working examples. Briefly, these compounds are prepared (1) by reacting an optionally substituted catechol with an optionally substituted epichlorhydrin to give the alcohol which is in turn converted into the desired amine or (2) by reacting the catechol with a reactive 1,2-dihalo compound then converting to the amine. These reactions are well illustrated hereafter.

The new 1:4-benzodioxan derivatives of the invention have been found to exhibit varied pharmacological activity in the animal body. Thus compounds falling within the definition of Formula 1 have been found to exercise peripheral pharmacological actions on the central nervous system, particularly on the sympathetic and parasympathetic nervous systems. For instance, some of the compounds such a 2-1'-quanidinoethyl-1:4-benzodioxan have very pronounced adrenergic nerve blocking activity, some such as 5:8 - dimethyl - 2' - guanidinomethyl - 1:4-benzodioxan have pronounced ganglion blocking activity and antihistaminic activity. All have these activities to a certain degree.

For practical use, the pharmacologically active compounds of the invention are made up into compositions containing at least one of said compounds as the essential active ingredient in an amount sufficient to produce the desired therapeutic effect, the active ingredient generally being in association with one or more pharmaceutical diluents and/or excipients therefor. The compositions can be made up in a dosage unit form adapted for the desired mode of administration which may be oral or parenteral. Thus the dosage may be a tablet, pill, capsule, or a sterile solution or suspension for parenteral administration.

The following examples illustrate the invention.

Example 1

2-aminomethyl-1:4-benzodioxan hydrochloride (8 g., Bovet et al., Arch. intern. pharmacodynamic 55, 15 (1937)) and cyanamide (8 g.) in water (16 cc.) are heated under reflux for 24 hours. The reaction mixture is cooled at 0° C. for several hours, filtered and the solid on the filter washed with ice-cold water (5 cc.). The filtrate and washings are warmed to 50° C. and potassium bicarbonate (8 g.) added. The quanidine bicarbonate which separates on cooling is isolated and suspended in water (32 cc.) at 50° C. Nitric acid (50%) is added dropwise until the solution is acidic and on cooling to 0° C. the nitrate of 2-guanidinomethyl-1:4-benzodioxan (7.6 g.) separates as colorless crystals, M.P. 164–165° C. after recrystallization from water.

Example 2

Catechol (103 g.) and anhydrous potassium carbonate (70 g.) is gently refluxing acetone are treated, by dropwise addition, with 3:4-dibromobutan-2-one (35 cc.). After addition of the 3:4-dibromobutan-2-one a further 70 g. of potassium carbonate are added in a single lot, followed by further slow addition of the ketone (35 cc.). This process is repeated a further three times with 60 g. of potassium carbonate and 35 cc. of the ketone being used each time. On completion of the additions, reflux is maintained for 20 hours. The resulting mixture is then cooled and filtered. The filtrate is concentrated, diluted with water and the product isolated by ether extraction. Distillation of the extracts gives 2-acetyl-1:4-benzodioxan (77 g.), B.P. 88° C. (0.05 mm.) which when crystallized from aqueous methanol has a M.P. of 34–35° C.

The reaction of 2-acetyl-1:4-benzodioxan (61.5 g.) with hydroxylamine hydrochloride (36 g.) and sodium acetate (110 g.) refluxed in 50% aqueous ethanol (600 cc.) gives, after concentration, ether extraction and distillation, 2-acetyl-1:4-benzodioxan oxime (65 g.), B.P. 123–124° C. (0.4 mm.).

The 1:4-benzodioxan oxime (41 g.) in ether (185 cc.) is added to a suspension of lithium aluminum hydride (30 g.) in ether (1050 cc.) and the mixture refluxed for 24 hours. Ethanol-ether (1:1) is used to destroy the excess hydride, and then saturated sodium sulphate is added until the solids form a paste. The ether is decanted, extracted with 2 N HCl, and the acid solution is basified with solid sodium carbonate and some 2 N NaOH. Ether extraction and distillation gives 2-1′-aminoethyl-1:4-benzodioxan (39 g.) B.P. 140–150° C. (14 mm.).

The 2-1′-aminoethyl-1:4-benzodioxan (15 g.) in ether is treated with excess isopropanolic-hydrogen chloride and the resulting 2-1′-aminoethyl-1:4-benzodioxan hydrochloride (11.5 g.) isolated by filtration. After crystallization from methanol-di-isopropyl ether the hydrochloride has a M.P. of 219–220° C.

The 2-1′-aminoethyl-1:4-benzodioxan hydrochloride (5 g.) and cyanamide (5 g.) in water (15 cc.) are heated at reflux for 24 hours. The resulting solution is cooled at 0° C. for two hours, filtered, and the filtrate made alkaline with potassium bicarbonate. An oil separates and on addition of nitric acid (1 part conc. $HNO_3$ to 1 part water) to the mixture until the solution is acidic, the oil slowly crystallizes. Isolation of this solid and repeated crystallization of it from mixtures of ethanol, methanol, ethyl acetate and hexane gives two isomers of 2-1′-guanidinoethyl-1:4-benzodioxan nitrate, one having a M.P. of 177–179° C. and the other having a M.P. of 144–146° C. Both forms crystallize as prisms.

*Example 3*

3:6-dimethylcatechol (26 g.) in acetone (300 cc.) is treated with anhydrous potassium carbonate (75 g.) and 3:4-dibromobutan-2-one (52 g.) in the manner described in Example 2, the addition of carbonate and ketone being made in four equal portions. The desired 2-acetyl-5:8-dimethyl - 1:4 - benzodioxan (9.9 g.) is isolated in the manner described in Example 2 and has a M.P. of 48–49° C., B.P. 87–89° C. (0.4 mm.).

The isolated ketone (8.6 g.), hydroxylamine hydrochloride (4.5 g.), sodium acetate (15 g.) and 50% aqueous ethanol (100 cc.) are heated at reflux for two hours and cooled at 0° C. The resulting 2-acetyl-5:8-dimethyl-1:4-benzodioxan oxime separates as needles (7.1 g.) and after crystallization from ether-hexane has a M.P. of 115–117° C.

The oxime (5.1 g.) in ether (60 cc.) is reduced with lithium aluminum hydride (2.7 g.) in ether (100 cc.) as described in Example 2 to give 2-1′-aminoethyl-5:8-dimethyl-1:4-benzodioxan (4.0 g.), B.P. 118–120° C. (1.25 mm.).

The foregoing amine (639 mg.) in ether (20 cc.) with excess isopropanolic hydrogen chloride gives the amine hydrochloride (450 mg.), M.P. 272–277° C. after crystallization from methanol - isopropanol-di-isopropyl ether.

The amine hydrochloride (350 mg.) is heated under reflux in water (10 cc.) with cyanamide (750 mg.) for 24 hours. The resulting solution is cooled and, after washing with ether, made alkaline with potassium bicarbonate. A gum precipitates and crystallizes very slowly. The solid obtained is isolated, suspended in 15 cc. of water and the resulting suspension made acid with 2 N $H_2SO_4$. The solid dissolves and on cooling the desired 5:8 - dimethyl-2-1′-guanidinoethyl-1:4-benzodioxan sulphate is obtained as plates, M.P. 223–230° C.

*Example 4*

3:6-dimethylcatechol (36 g.) in acetone (250 cc.) is reacted with anhydrous potassium carbonate (104 g.) and ethyl, α,β-dibromopropionate (78 g.) in a manner similar to that described in Example 2, the addition of ester and carbonate being made in four equal portions. The desired 2-carbethoxy-5:8-dimethyl-1:4-benzodioxan has a B.P. of 100° C. (0.25 mm.).

The foregoing ester (15 g.) is shaken with excess ammonia solution for 4 hours and the resulting solid 5:8-dimethyl-1:4-benzodioxan - 2 - carbonamide (12.9 g.) isolated by filtration. The amide has a M.P. of 120–121° C. after crystallization from light petroleum (B.P. 60–80° C.).

The foregoing amide (11.8 g.) in ether (50 cc.) is reduced with lithium aluminum hydride (5 g.) in ether (250 cc.) by the method described in Example 2. On extraction of the initial etheral solution with 2 N HCl, 5:8-dimethyl-2-aminomethyl - 1:4 - benzodioxan hydrochloride (10.8 g.) separates and is collected and re-crystallized from methanol-water to yield crystals having a M.P. of 254–255° C.

The foregoing hydrochloride (2.5 g.) and cyanamide (2.5 g.) are heated under reflux in 10 cc. water for 24 hours, then cooled at 0° C. for two hours and filtered. Potassium bicarbonate is added to the resulting filtrate at 50° C., thereby precipitating 5:8-dimethyl-2-guanidinomethyl-1:4-benzodioxan bicarbonate, which is filtered off, re-suspended in 10 cc. of water at 40° C., acidified with diluted (1:1) nitric acid and cooled to 0° C. The nitrate of the above-mentioned compound crystallizes out and is further re-crystallized from water, M.P. 150–151° C.

The intermediate amine 5:8-dimethyl-2-aminomethyl-1:4-benzodioxan is also prepared by the following alternative method.

3:6-dimethylcatechol (16.5 g.), epichlorhydrin (10 cc.) and 12% potassium hydroxide (50 cc.) are heated together at 60° C. under an atmosphere of nitrogen in a sealed flask for 20 hours. The reaction mixture is then cooled and extracted with ether. After washing with 2 N NaOH and water, the etheral solution is dried over magnesium and evaporated. Distillation of the residue yields 5:8 - dimethyl - 2 - hydroxymethyl - 1:4 - benzodioxan, B.P. 110–120° C. (0.5 mm.). This alcohol (5 g.) is heated at 0° C. with phosphorous tribromide (1.8 cc.) and allowed to stand at room temperature for three days. The reaction mixture is poured on to ice and the reaction product extracted with dichloromethane. Evaporation of the solvent and distillation gives 2-bromomethyl-5:8-dimethyl-1:4-benzodioxan (2.4 g.), B.P. 92° C. (0.2 mm.), 1.6 g. of which are heated with excess 12% ethanolic ammonia in a steel bomb at 120° C. for 18 hours. The ethanol is evaporated. The residue is treated with 2 N HCl, washed with ether, and basified with 2 N NaOH. The resulting amine is extracted into ether and on shaking with 2 N HCl the desired 5:8-dimethyl-2-aminomethyl-1:4-benzodioxan hydrochloride (0.26 g.) separates and is collected, M.P. 254–255° C.

*Example 5*

An equimolar quantity of 7-chloro-2-aminomethyl-1:4-benzodioxan hydrochloride [Marini-Bettolo, et al., Croat. Chem. Acta 29, 363 (1957)] is substituted for the amine in Example 1 to give, with sulfuric acid, 2-guanidino-methyl-7-chloro-1:4-benzodioxan sulfate.

7-methoxy and 7-nitro-2-aminomethyl-1:4-benzodioxan salts (same reference) give respectively 2-guanidinomethyl-7-methoxy-1:4-benzodioxan nitrate and 2-guanidinomethyl-7-nitro-1:4-benzodioxan nitrate.

2-3′-aminopropyl-1:4-benzodioxan hydrochloride [Landi-Vittory, et al., Rend. ist. super. sanita 22, 217 (1959)] gives 2-3′-quanidinopropyl-1:4-benzodioxan nitrate.

2-aminomethyl-3-methyl-1:4-benzodioxan (Koo, J., et al., Chem. & Ind. 1958 832) gives 2-guanidinomethyl-3-methyl-1:4-benzodioxan hydrochloride.

What is claimed is:

1. A pharmaceutically acceptable, nontoxic acid addition salt of 2-guanidinomethyl-1:4-benzodioxan.
2. 2-guanidinomethyl-1:4-benzodioxan nitrate.
3. A pharmaceutically acceptable, nontoxic acid addition salt of 2-1′-guanidinoethyl-1:4-benzodioxan.
4. 2-1′-guanidinoethyl-1:4-benzodioxan nitrate.
5. A pharmaceutically acceptable, nontoxic acid addition salt of 5:8-dimethyl-2-guanidinomethyl-1:4-benzodioxan.
6. A pharmaceutically acceptable nontoxic acid addition salt of 5:8-dimethyl-2-1′-guanidinoethyl-1:4-benzodioxan.

References Cited

UNITED STATES PATENTS 2,725,386  11/1955  Bovet et al. _____ 260—340.3

NORMAN S. MILESTONE, *Primary Examiner.*

NICHOLAS S. RIZZO, JOHN D. RANDOLPH,
*Examiners.*

D. M. KERR, *Assistant Examiner.*